United States Patent [19]
Yamamoto et al.

[11] Patent Number: 4,457,605
[45] Date of Patent: Jul. 3, 1984

[54] CAMERA WITH A MOTOR DRIVEN FILM TRANSPORT DEVICE

[75] Inventors: Koji Yamamoto, Sakai; Fumio Yoshida, Kawachinagano, both of Japan

[73] Assignee: Minolta Camera Kabushiki Kaisha, Osaka, Japan

[21] Appl. No.: 407,939

[22] Filed: Aug. 13, 1982

[30] Foreign Application Priority Data

Aug. 26, 1981 [JP] Japan ................... 56-134595

[51] Int. Cl.³ .................. G03B 17/42; G03B 1/00
[52] U.S. Cl. .................. 354/173.11; 354/206; 354/214
[58] Field of Search ............ 354/171, 173, 204–206, 354/213, 214, 268, 173.1, 173.11

[56] References Cited

U.S. PATENT DOCUMENTS 4,196,993 4/1980 Stemme et al. ............... 354/173
4,309,097 1/1982 Stemme et al. ............... 354/173

Primary Examiner—William B. Perkey
Attorney, Agent, or Firm—Watson, Cole, Grindle & Watson

[57] ABSTRACT

The drive force of a motor built in a camera is separately transmitted through respective clutches to a film drive device for one-frame film wind-up and a shutter mechanism for shutter cocking. The film drive mechanism is associated with a detector for detecting completion of the film wind-up operation, while the shutter mechanism is also associated with another detector for detecting completion of the shutter cocking. The detectors generate a "high" or a "low" digital signal corresponding to the detections. A discriminating circuit logically determines whether the wind-up operation is completed, according to the timed relationship between the signals, and detects the end of the film being reached when the film wind-up has not been terminated upon detection of the shutter cocking completion. By this detection, motor drive for film wind-up is stopped, subsequent shutter release is forbidden and motor drive for film rewinding is initiated.

14 Claims, 3 Drawing Figures

CAMERA WITH A MOTOR DRIVEN FILM TRANSPORT DEVICE

BACKGROUND OF THE INVENTION

1. Technical Field

The present invention relates to a camera in which the single frame film advance and shutter cocking are effected by the drive force of a built-in motor, and particularly to a camera provided with a detector device that, once the last frame of the film has been exposed, automatically detects that it is not possible to advance the film beyond the current frame.

2. Description of the Prior Art

Compared with cameras that are constructed such that the film advance and shutter cocking are respectively effected by the drive of separate motors, cameras in which the film advance and shutter cocking are effected by the drive of a single motor are lighter, more compact, and cheaper. In connection with the latter camera construction, the following two systems have been known as the transmission means for transmitting the drive force of the single motor to the film drive section which effects the film advance and to the shutter drive section which effects the shutter cocking. One of them is a system wherein the film drive section and the shutter drive section may be independently linked to a single motor via clutches, and the other is a system wherein the film drive section and the shutter drive section are linked together to a single motor via a transmission mechanism which drives both the film drive section and the shutter drive section.

However, in the former transmission system, as the film drive section and the shutter drive section are independently driven by a single motor, a malfuntion or inconvenience as described below will occur when it becomes impossible to advance the film further. When it becomes impossible to advance the film further, the advancing of the film by the film drive section stops part-way through a cycle, i.e. in an uncompleted state, and the shutter cocking operation by means of the shutter drive section is continued and completed, irrespectively of the state of the film drive section. If the shutter button is pressed depressed down subsequently, the camera shutter mechanism will operate normally, and an exposure will be made, causing multiple exposure of the last frame, or a portion thereof. Accordingly, it is necessary to prohibit the aforementioned operation of the camera's shutter mechanism, to prevent multiple exposure, by detecting when the film advance has become impossible. It may be possible to detect the operative condition of the film drive section mechanically if the film drive section and the shutter drive section are provided with a film advance completion detection member and a shutter cocking completion detection member provided to respectively detect the completion of the respective operations of the film drive section and the shutter drive section, and also with a member which detects the mutual status of the two detection members (i.e. detects whether or not the film advance is completed when the shutter charge has been completed). However, with this arrangement, the camera becomes mechanically complicated and cumbersome.

In the latter transmission system, the film drive section and the shutter drive section are operated together, and the operation of both the film advance and shutter charge operations stop part-way through a cycle, i.e. in the uncompleted state when it becomes impossible to advance the film. Accordingly, this system does not allow the defect of multiple exposure as discussed above with respect to the former type. However, if the camera with the latter transmission system is further provided with a mechanism for rewinding the film by means of the drive of the same single motor in addition to the mechanism for advancing the film and cocking the shutter by the same motor, an additional clutch mechanism is required in association with the single motor to disconnect the film drive section from the shutter drive section, and to drive the film drive section only in the opposite direction in communication with the single motor. This clutch mechanism must be provided in association with the transmission means, and so a camera with such a mechanism becomes complicated. On the other hand, the former transmission system operates the film drive section independently of the shutter drive mechanism, and so the film can be rewound simply by driving the film drive section in reverse without the need for any further clutch mechanism. Thus, both transmission systems have respective advantages and disadvantages.

Besides the mechanical detection means described above, electric detection means are known detect the inability of further film advance in accordance with whether or not the time taken to advance the film has exceeded a prescribed time such as is required for advancing the film, or whether or not the electric current of the film advance motor has exceeded a predetermined boundary level for the detection of the increase of the current when it has become impossible to advance the film. However, the period for the film advance for one frame and the current for driving the motor at the time of normal film advancing, vary in accordance with variations in the power source voltage and the advance load or back tension of the film in use, so that the circuit constants of the electrical circuit must be determined in consideration of the electric factors such as the power source voltage variation and the load current variation which varies in alanlog form. A considerable amount of time is thus consumed in the determination of these circuit constants in the assembly of each camera with such detectors. Thus, it is desired to provide a circuit that can electrically detect the state of the film advancement, with a simple circuit structure that does not require consideration of these factors.

SUMMARY OF THE INVENTION

It is an object of the present invention to provide a device which, with a simple mechanical and electrical structure, automatically detects inability of further film advancing due to the end of the film in a camera wherein the film advance and shutter charge are effected by a single motor built in the camera.

It is another object of the invention to provide a motor drive mechanism that permits the film to be rewound upon detection of the camera condition wherein the film cannot be advanced further due to the end of the film.

It is yet another object of this invention to provide a simple mechanical and circuit structure which causes the film to be rewound immediately after the detection of the camera state in which the film cannot be advanced further due to the end of the film.

It is a further object of this invention to provide a device that does not allow the shutter to be released, even if the shutter charge has been completed, when the film advance inability is detected.

According to the present invention, the film transport and shutter cocking device include a motor driven mechanism wherein the drive force of a single motor is separately transmitted to film wind-up and shutter cocking mechanisms to effect the film wind-up and shutter cocking operation independently of each other; a detector means which the respective operating condition of the film wind-up and shutter cocking mechanism with respect to whether they have completed their operation or not; and a discriminating circuit comprising a logic circuit having input terminals applied with the outputs of the detector means, discriminating circuit discriminating the inability of further film advance after the exposure of the last frame, on the basis whether the film wind-up operation has been completed when the shutter cocking operation is completed.

According to the invention, as the inability to advance the film is detected digitally by means of the discrimination circuit with the logic circuit, there is no need, as there was heretofore, to determine circuit constants in consideration of analog factors such as the variations in supply voltage and the load of the film wind-up, thereby making the circuit design very much simpler and making the actual structure of the circuit somewhat simpler as well. Further, with this circuit structure, the inability to advance the film can be detected easily, so that compared with devices wherein the inability of the structure of the mechanical parts is kept from becoming complicated in comparison with the device wherein the inability to advance the film is detected mechanically.

According to an embodiment of the invention, the film drive section is provided with a film drive switching mechanism to automatically switch the operating state of the film drive section from film advance to film rewind in response to the detection of the inability of the film advance. In connection with that mechanism, as the film drive section is arranged to be switched between film advancing and film rewinding states independently of the shutter cocking mechanism, the mechanism for switching the camera from a film advancing to a film rewinding mode will be simpler than that in which the film advance and shutter charging are mutually linked.

Further, according to another embodiment of this invention, the shutter release is prohibited by the detection of the inability to advance the film, so that even if the shutter charging were completed by an independently operating shutter drive mechanism, the shutter cannot be released by accidental or erroneous pressing of the shutter button in so far as the film advance has not been completed, and thus multiple exposure can be prevented.

BRIEF DESCRIPTION OF THE DRAWINGS

The foregoing and other objects and advantages of the present invention will become clear from the following description taken in conjunction with the accompanying drawings, wherein.

DETAILED DESCRIPTION OF THE PREFERRED EMBODIMENTS

Figure 1:
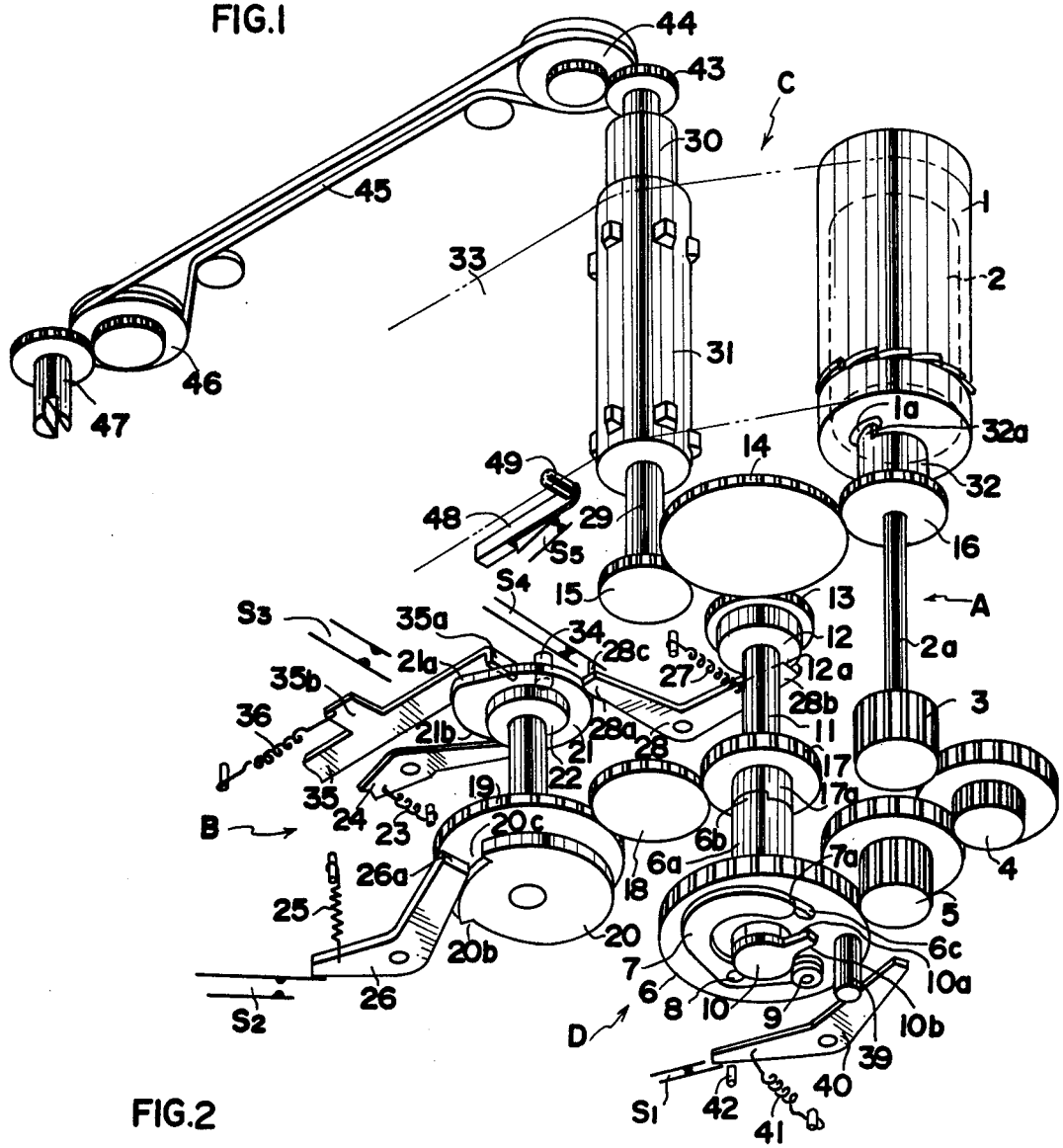
FIG. 1 is a perspective view from the bottom of a camera, showing an embodiment of a motor drive mechanism for a camera according to this invention.

FIG. 1 shows an embodiment of a motor drive mechanism according to the present invention, as employed in a single lens reflex camera. The drawing shows the state in which both the shutter cocking and the film wind-up operations have been completed. The motor drive mechanism generally comprises a motor section A, a shutter drive section B which raises and lowers the mirror and effects the shutter cocking, a film drive section C that effects the film advance and film rewind, and a clutch section D that separately and independently transmits the drive force of the motor section A to the shutter drive section B and the film drive section C. Motor 2 in motor section A has its operation controlled by the motor control circuit shown in FIG. 3 to be rotated in the counterclockwise direction in response to the release of the shutter by the depression of a shutter release button (not shown), for raising the reflex mirror. Motor 2 is also rotated in the clockwise direction upon completion of the exposure, to lower the mirror, charge the shutter and advance the film. Also, when the inability to advance the film is detected after exposure of the last frame of film, motor 2 is rotated in the clockwise direction to rewind the film. The rotation of motor 2 is transmitted to clutch gear 6 via a motor shaft 2a, motor gear 3 and reduction gears 4 and 5. Spool 1 which can be rotated independently of the rotation of the motor 2 is mounted to the outside of the motor 2 in such a way as to surround the same. The disposition of motor 2 is, however, not limited to the inside of the spool 1 as described above, but the motor may be in the space between the spool chamber and the shaft for the shutter curtain in the camera, or in the space beneath the mirror box. Further, spool 1 and the motor 2 may also be provided integrally and constructed such that spool 1 and motor 2 rotate in the opposite directions.

In clutch section D, the clutch gear 6 is constructed to rotate through precisely two rotations from the initial position shown in the Figure, each time a single exposure is made. Switch lever 40 is arranged such that one end thereof lies in the path of clutch pin 39 carried by clutch gear 6 to be engaged thereby and determine the aforementioned initial position of gear 6. The other end of switch lever 40 is biased in a counterclockwise direction by the spring 41. Switch lever 40 rotates in accordance with the rotation of the clutch pin 39 with this rotation being restricted by pin 42 fixed on the camera body. Normally closed switch S₁ serves as a position detector switch for detecting the initial position of clutch gear 6, and is opened and closed in accordance with the rotation of the switch lever 40. In the illustration, switch lever 40 is engaged by clutch pin 39, and switch S₁ is closed. Further, the transmission clutch 6a integral with clutch gear 6 has notch 6b cut out in the form of saw teeth, and transmits only the clockwise rotation of the clutch gear 6 to shutter drive section B.

Clutch lever 7, clutch roller 9 and clutch plate 10 are associated with clutch gear 6 to form a clutch for the motor drive transmission to film drive section C. Clutch lever 7 has shaft 8 fixed to the clutch gear 6 and is provided at one end with spring retaining portion 7a which extends through hole 6c in clutch gear 6. Clutch lever 7 is further provided at the other end thereof with clutch roller 9 which is pivoted thereon and is capable of driving the clutch plate 10. Clutch roller 9 is biased in the counterclockwise direction about the shaft 8 by a spring (not shown) with one end retained on the spring retaining portion 7a of the clutch lever 7. Clutch plate 10 is formed with a projection having cam surfaces 10a and 10b which are arranged to be engaged by clutch roller 9 during film advance and film rewind operations respectively. With the rotation of the clutch gear 6, clutch roller 9 moving therewith pushes this projection to rotate clutch plate 10 in the direction of rotation of the clutch gear 6. When the film is advanced, cam surface 10a of the projections is engaged and pushed by clutch roller 9 on the second rotation of the clutch gear 6, whereby clutch plate 10 rotates in the direction of rotation of the clutch gear 6, and one rotation of the clutch plate 10 advances the film precisely one frame. The force of the aforementioned spring connected to end 7a of clutch lever 7 should be selected to be of a strength that will not cause the film to break while the film is being driven normally; but which is greater than the normal film drive load, and does not allow clutch roller 9 to move over the projection on clutch plate 10 when it engages the base of the projections, during normal film advance and rewind operation, but does allow clutch roller 9 to move over the projections on clutch plate 10 when, due to the inability of the film to advance after the exposure of the last frame of the film, the advancing load increases and exceeds the force of the aforementioned spring. Also, in the state illustrated, clutch roller 9 is positioned at a predetermined position adjacent to the clockwise side 10b of the projection of clutch plate 10.

In shutter drive section B, transmission gear 17 has notch portion 17a which engages notch portion 6b of the aforementioned transmission clutch 6a such that rotation of clutch gear 6 in the clockwise direction only is transmitted to transmission gear 17. Transmission gear 17 is biased by a spring (not shown) downwards such that transmission gear 17 abuts against clutch gear 6. The clockwise rotation of clutch gear 6 which is transmitted to transmission gear 17 via the transmission clutch 6a is transmitted to charge gear 19 via idler gear 18 with the speed being reduced. The number of teeth of respective gears 6, 17, 18 and 19 are determined to provide the reduction ratio such that two rotations of clutch gear 6 in the clockwise direction cause charge gear 19 to rotate precisely one rotation in the clockwise direction. Respectively co-axially fixed to the charge gear 19 are switch cam 20, shutter charge plate 21 and mirror drive cam 22. Switch cam 20 is formed with a cam surface of a predetermined profile to open and close motor drive switch $S_2$ via switch lever 26 with a predetermined timed relationship with the releasing of the shutter and the charging of the shutter respectively. Switch lever 26 is biased in a clockwise direction by a spring 25, and one end 26a of the switch lever 26 always bears against the cam surface of switch cam 20 so that the switch lever is rotated in accordance with rotation of switch cam 20. Normally open switch $S_2$ is a motor drive switch for controlling the motor in response to the rotation of clutch gear 6 in the clockwise direction. Switch $S_2$ is opened and closed in accordance with the rotation of switch lever 26, and is open when one end 26a of switch lever 26 falls into cam depressions 20b or 20c on switch cam 20. In the initial state as shown, one end 26a of switch lever 26 is positioned adjacent to the clockwise side of the cam depression 20c of the switch cam 20, with motor drive switch $S_2$ open. Shutter charge plate 21 effects the charging of the shutter by operating a shutter charge mechanism (not shown) via charge lever 35, and is biased towards the lower left as viewed in the drawing by means of spring 36. Charge pin 34 is carried by shutter charge plate 21 at a position where pin 34 can engage bent or downwardly extending portion 35a of charge lever 35 during shutter charging. Charge pin 34 engages bent portion 35a of charge lever 35 when shutter charge plate 21 rotates in the clockwise direction, whereby charge lever 35 is driven thereby to the upward right direction against the biasing force of the spring 36 to operate the shutter charge mechanism. When the shutter charging operation is completed, the aforementioned engagement is released, whereby the charge lever 35 returns to the lower left under the biasing force of spring 36. Normally open switch $S_3$ is a charge completion detection switch which functions as a second detection means for detecting the state of the motor drive mechanism caused upon the completion of shutter charging. Switch $S_3$ is provided at a position where projection 35b of charge lever 35, which is driven to the upward right in conjunction with the shutter charging operation, reaches at the time of completion of shutter charging operation, or a position immediately before that position, and is momentarily closed when shutter charging is completed. Also, shutter charge plate 21 has a cam profile projecting at one portion on the rim, with cam surfaces 21a and 21b. Stop lever 28 to be described below is engageable with these cam surfaces. Mirror drive cam 22 operates a mirror drive mechanism (not shown) via a mirror drive lever 24, to raise and lower the reflex mirror (not shown) of the single lens reflex camera according to this embodiment. Mirror drive cam 22 has a cam profile of the shape of a circle with a portion being cut-out in the form of a segment. The cam periphery is engaged by one end of the mirror drive lever 24 which is urged in the counterclockwise direction by spring 23. As mirror drive cam 22 rotates, the one end of mirror drive lever 24 which bears against the cam periphery of the mirror drive cam, rotates, upon releasing of the shutter, in the clockwise direction against the force of spring 28, thereby raising the reflex mirror to retract from the photographic light path. At the time of shutter cocking, mirror drive lever 24 rotates counterclockwise under the force of spring 23 to lower the reflex mirror. Mirror drive lever 24 may be interlocked with a diaphragm adjusting mechanism such that the rotation of mirror drive lever 24 causes the lifting of the reflex mirror and at the same time actuates the diaphragm adjusting mechanism (not shown) to stop down the diaphragm aperture to a preset value.

In the film drive section C, stop cam 12 and transmission gear 13 are integrally fixed to clutch shaft 11 which rotates integrally with the clutch plate 10. Clutch shaft 11 passes loosely through transmission clutch 6a and transmission gear 17 in the axial direction. Stop cam 12 cooperates with stop lever 28 to effect single frame advance, and detects the completion of a one frame film advance. Stopper cam 12 has a round cam profile with a single depression 12a. One end 28b of stop lever 28 which is urged in the counterclockwise direction by spring 27, is engageable into depression 12a while stop cam 12 is rotated in the clockwise direction. Further, as stated earlier, one end 28a of stopper lever 28 is engageable with the cam periphery of shutter charge plate 21 under the biasing force of spring 27. Stop lever 28 is constructed such that either one end 28a or the other 28b thereof is in contact with the portion of the cam periphery other than the cam periphery of shutter charge plate 21 or the depression of stop cam 12. Thus, as illustrated in the FIG. 1, when the shutter charge and the film advance operations are both completed, one end 28a of stop lever 28 is in contact with the portion of the cam periphery other than the projection on shutter charge plate 21, and the other end 28b of the stop lever 28 falls into and is engaged with cam depression 12a on stop cam 12.

The relative cam positions of clutch plate 10, stop cam 12 and shutter charge plate 21 are determined such that after the completion of the exposure, motor 2 rotates shutter charge plate 21 in the clockwise direction with cam surface 21a thereof pushing one end 28a of stop lever 28 in the clockwise direction and disengages the other-end 28b of stop lever 28 from depression 12a of stopper cam 12, following which the clutch plate 10 begins to be rotated in the clockwise direction via clutch roller 9. Further, pin 28c is carried on one end 28a of stop lever 28. Pin 28c opens and closes a normally closed film advance completion detector switch $S_4$ which functions as a first detection means for detecting the completion of the one frame film advance, in accordance with the rotation of stopper lever 28. Advance completion detector switch $S_4$ is opened by pin 28c substantially simultaneously with the disengagement of stopper lever 28 from the stopper cam 12, and is subsequently closed substantially simultaneously with the reengagement of stop lever 28 with stop cam 12.

Also, the rotation of transmission gear 13 which is mounted integrally with the clutch plate 10, is transmitted via idler gear 14 to sprocket gear 15 and spool gear 16 respectively. Electromagnetic clutch 30, which serves as a switching mechanism for switching the mode of film transportation, switches film drive section C between film advance and film rewind modes as described hereinbelow. The rotation of the sprocket shaft 29 for sprocket gear 15 is transmitted via electromagnetic clutch 30 to either sprocket 31 or rewind gear 43. In the state illustrated in FIG. 1, sprocket shaft 29 and sprocket 31 are coupled, as described hereinbelow. The respective numbers of teeth of the gears 13, 15 and 16 are selected such that one rotation of transmission gear 13 produces a rotation of sprocket gear 15 corresponding to one frame advancing of the film, while spool gear 16 is rotated by a predetermined amount in excess of the amount of rotation corresponding to one frame advance of the film. Friction spring 32 is bounded at its lower portion by spool gear 16, while a upper end projection 32a of spring 32 fits into a hole 1a in spool 1, to provide a friction coupling between spool gear 16 and spool 1. Friction spring 32 serves to compensate for the differences between the predetermined quantity of film that is advanced by spool gear 16 and the amount of film that is advanced by the spool 1, the difference varying as the advancing of the film progresses. The rotation of rewind gear 43 is transmitted via rewind pulley 44, belt 45 and another rewind pulley 46 to rewind fork 47 which engages a shaft of a film cartridge (not shown). Further the aforementioned friction spring 32 also serves the function of compensating for the differences that are produced between the amount of film rewound by spool 1 which amount varies in accordance with the progress of the rewinding of the film, and the fixed amount of film rewound by rewind fork 47. Pin 49 which detects the absence or presence of film 33, is provided in the vicinity of sprocket 31, with the tip of pin 49 being urged by leaf spring 48 to come into contact with the surface of film 33 in the vertical direction. Film presence detector switch $S_5$ is disposed to the rear of pin 49 and is opened or closed in accordance with the presence or absence of the film, being closed when film 33 is present, and open when it is not.

Figure 2:
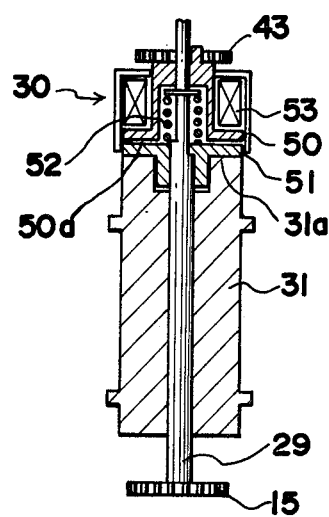
FIG. 2 is a sectional view showing a portion of the mechanism of FIG. 1 taken along the axis of rotation (line I—I in FIG. 1)
Figure 3:
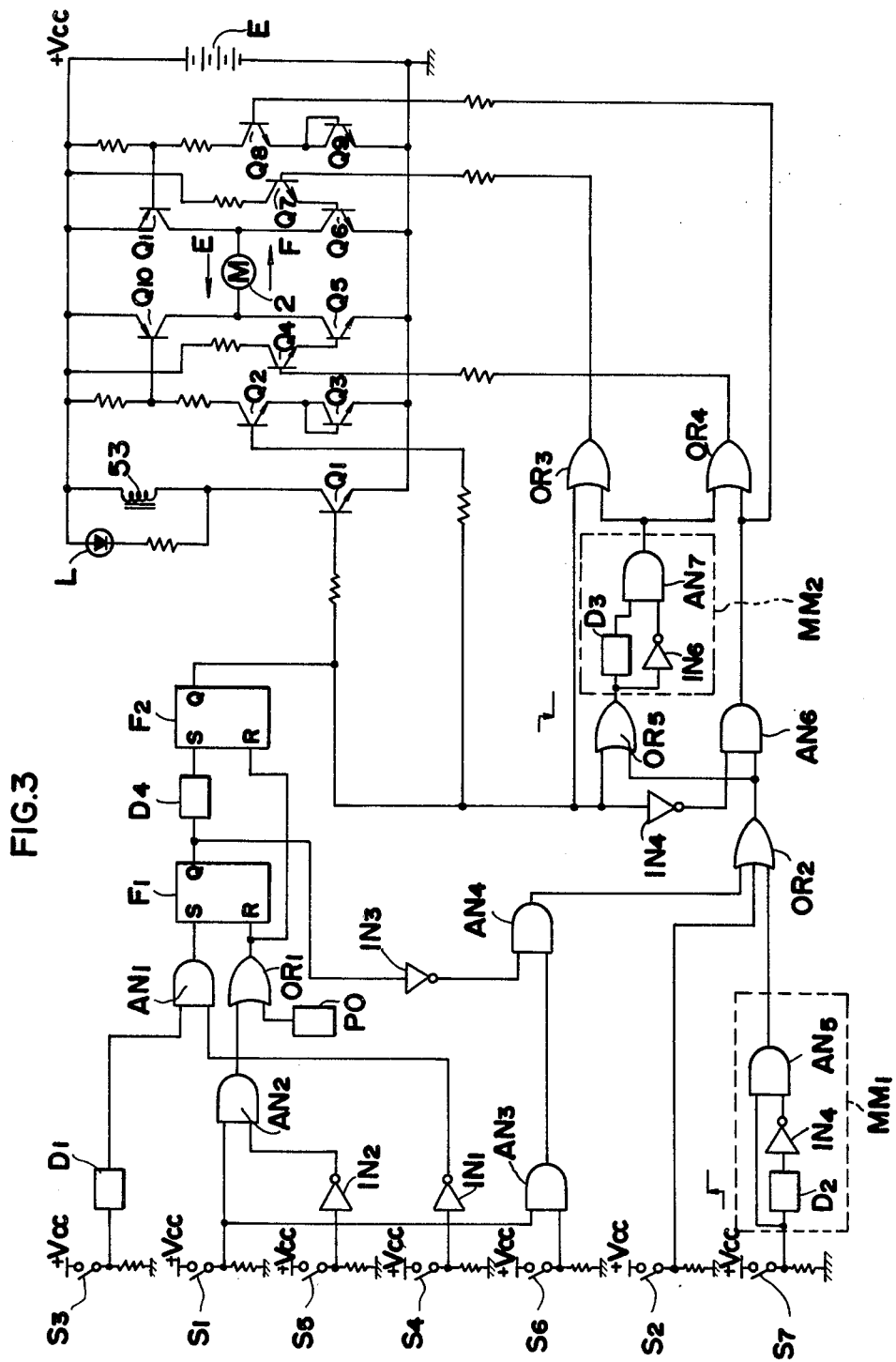
FIG. 3 is a circuit diagram showing an embodiment of a motor control circuit for controlling the operation of the motor drive mechanism of FIG. 1.

In FIG. 2 is shown a cross-sectional view of the electromagnetic clutch mechanism of electromagnetic clutch 30. In this figure, friction ring 50 formed integrally with rewind gear 43, is provided at its bottom surface 50a with a friction clutch surface that is brought into friction coupling with clutch plate 51 to be described below. Clutch plate 51, which is formed integrally with sprocket shaft 29, is located between friction ring 50 and sprocket 31, and is brought into friction coupling with either friction clutch surface 31a formed on the top surface of sprocket 31, or friction clutch surface 50a formed on the bottom surface of the aforementioned friction ring 50. Spring 52 is disposed between friction ring 50 and clutch plate 51, urging these components apart, so that in the state illustrated in FIG. 1, clutch plate 51 and sprocket 31 are friction coupled whereby sprocket 31 is coupled to sprocket shaft 29. The electromagnetic coil 53 is controlled by a motor control circuit. When electromagnetic coil 53 is energized clutch plate 51 is attracted by the electromagnet against the urging force of spring 52, thereby bringing the clutch plate 51 and friction ring 50 into friction coupling engagement with each other, to cause rewind gear 43 and sprocket shaft 29 to be interconnected. FIG. 3 is a circuit diagram showing an embodiment of a motor control circuit to be used with the mechanism shown in FIGS. 1 and 2. In the Figure, switches $S_1$ through $S_7$ all have a respective terminal connected to the positive terminal of power supply E, while the other respective terminal is connected to the negative terminal of the power supply E via respective resistances. Switch $S_6$, which is not shown in FIG. 1, is a known release switch which, for instance, is linked with the shutter release button for commencing the release of the camera shutter such that it is closed by depression of the shutter release button and is opened by releasing the shutter release button. Switch $S_7$ which is similarly not shown in FIG. 1, is a known exposure completion detector switch which, for example, is closed in response to completion of the travel of a second or trailing curtain of a camera focal plane shutter, and is opened by the completion of the film advance. An AND gate AN1 serves as a film advance state discrimination circuit for discriminating whether film advance is possible or impossible because of the end of the film after the exposure of the last frame of film and is fed with the voltage level at the lower terminal of charge completion detector switch $S_3$ via delay circuit D1 and with the voltage level at the lower terminal of the film advance completion detector switch $S_4$ via inverter IN1, thereby making the output level of AND gate AN1 "High" when the shutter charge is completed before the completion of the film advance, that is to say, when it becomes impossible to advance the film. It is to be understood that the delay time of the delay circuit D1 is set to a value to adjust the timed relationship between the operations of switches $S_3$ and $S_4$ such that during normal film advancing, the shutter charge completion is always detected after the detection of the completion of the film advance. Flip-flop $F_1$ receives as its set input, the output of AND gate AN1, and thus stores the signal representing the inability of film advance. AND gate AN2 which detects the completion of film rewinding, is fed with the voltage level at the lower terminal of position detector switch $S_1$, and the voltage level at the lower terminal of film presence detector switch $S_5$ via inverter IN2, and makes its output level "High" when switch $S_1$ is closed after completion of the film rewinding. Power-on-reset circuit PO outputs a pulse signal of a "High" level for a predetermined period in response to switching-on of the power source of the camera. OR gate OR1 is fed with the outputs from AND gate AN2 and power-on-reset circuit PO. Flip-flops $F_1$ and $F_2$ are both reset by a "High" output from OR gate OR1. AND gate AN3 is fed with the voltage level at the lower terminal of position detector switch $S_1$ and the voltage level at the lower terminal of release switch $S_6$. AND gate AN4 which functions as a release prohibit circuit, is fed with the output of the AND circuit AN3, and with the Q output (output from the Q terminal) of flip-flop F1 via the inverter IN3, and prohibits the release operation of the shutter when the inability to advance the film is detected, upon or during the film advancing after the exposure of the last frame of the film. Monostable multivibrator MM1 comprising delay circuit D2, inverter IN4 and AND gate AN5, is fed with the voltage level at the lower terminal of the exposure completion detector switch $S_7$, and generates a "High" level output signal for a predetermined period of time given by delay circuit D2 when that voltage level rises from "low" to "high". The delay time of delay circuit D2 is selected to be no less than the period taken from the time of the detection of the termination of an exposure by switch $S_7$ to the time of the closure of switch $S_2$ by the rotation of switch cam 20 due to the recommencement of rotation of the motor 2. OR circuit OR2 is fed with the output of AND gate AN4, the output of monostable multivibrator MM1 and the voltage level at the lower terminal of motor drive switch $S_2$. Flip-flop $F_2$ is set by the Q output of flip-flop $F_1$ applied via the delay circuit D4, and outputs a "High" level drive signal for film rewinding upon detection of the inability to advance the film after the exposure of the last frame of film. The "High" level signal from flip-flop $F_1$ energizes electromagnetic coil 53 and also causes motor 2 to rotate in the clockwise direction. The delay time of delay circuit D4 is predetermined to be no less than the time taken from the time of detection of the inability to advance the film by AND gate AN1 until the motor is abruptly stopped by the opening of motor drive switch $S_2$. AND gate AN6 which outputs a "High" level drive signal to drive motor 2 in the counterclockwise direction as viewed in FIG. 1, is fed with the output of OR gate OR2, and the Q output of Flip-flop F2 via inverter IN5. Monostable multivibrator MM2 including delay circuit D3, inverter IN6 and AND gate AN7 is fed with the Q output of flip-flop F2, and the output of OR gate OR5 which in turn is fed with the output of OR gate OR2. When the output level of OR gate OR2 drops from "high" to "low", monostable multivibrator MM2 outputs a "high" level pulse of a duration required to abruptly stop motor 2. The delay time of delay circuit D3 is set to provide the aforementioned duration of the pulse. Series connected PNP transistor Q10 and NPN transistor Q5, and series connected PNP transistor Q11 and NPN transistor Q6, are parallelly connected to the power source E, with motor 2 being connected between the node between transistors Q10 and Q5 and the node between transistors Q11 and Q6. The output of OR gate OR3 which is fed with the Q output of flip-flop F2 and the output of monostable multivibrator MM2, is connected to the base of transistor Q6 via transistor Q7. The output of OR gate OR4 that is fed with the outputs of AND gate AN6 and monostable multivibrator MM2, is connected to the base of the transistor Q5 via transistor Q4. The Q output of flip-flop F2 is connected to the base of transistor Q10 via transistor Q2, and the output of AND gate AN6 is connected to the base of transistor Q11 via transistor Q8.

Further, electromagnetic coil 53 of electromagnetic clutch 30 is parallelly connected to power source E via transistor Q1 which receives the Q output of the flip-flop F2 at its base. Across electromagnetic coil 53 is connected series connected light emitting diode L and a current control resistance. Light emitting diode L is energized to indicate that motor 2 is in the film rewind mode.

Hereinbelow the operation of the above described embodiment is explained with reference to the drawings. First, it is assumed that the shutter charging and film advance are completed, with the various members and components being at the operative positions indicated in FIG. 1. Then, when, in this state, the power source is switched on, a "high" level signal is output in the form of a pulse by the power on reset circuit PO, and this signal resets flip-flops F1 and F2 via OR gate OR1. Accordingly, transistor Q1 remains blocked, and no current flows through electromagentic coil 53, whereby electromagnetic clutch 30 couples sprocket shaft 29 with sprocket 31 via clutch plate 51. At this time, release switch $S_6$, motor drive switch $S_2$, and exposure completion detector switch $S_7$ are all opened, so that the output of OR gate OR2 is at a "Low" level, with motor drive transistors Q5, Q6, Q10 and Q11 being all blocked to deenergize motor 2.

Next, the not-shown shutter button may be depressed to close release switch $S_6$, whereupon since position detector switch $S_1$ is closed with flip-flops F1 and F2 having been reset, the outputs of AND gates AN3 and AN4, OR gate OR2, AND gate AN6, and OR gate OR4 all go to "High" levels. Accordingly, motor drive transistors Q5 and Q11 are rendered conductive to feed motor 2 current in the direction of arrow E, and begins to rotate the motor in the counterclockwise direction. The rotation of motor 2 in the counterclockwise direction causes clutch gear 6 to begin rotating in the clockwise direction. This rotation is transmitted to transmission gear 17 via transmission clutch 6a to shutter drive section B. Also, as clutch lever 7 which serves as a transmission clutch to the film drive section C has its shaft 8 secured to clutch gear 6, the clutch lever begins to rotate in the clockwise direction together with the rotation of the clutch gear 6. At this time, the projecting cam portion of clutch plate 10 is on the counterclockwise side of the clutch roller 9, whereby clutch roller 9, mounted on the other end of the clutch lever 7, rotates in a direction to be separated from the clutch plate 10, with the clutch plate 10 remaining stationary. Accordingly, spool 1 and sprocket 31 also remain stationary. The rotation of transmission gear 17 causes charge gear 19 to rotate in the clockwise direction, and switch cam 20, shutter charge plate 21, and mirror drive cam 22 which are all integral with the charge gear 19, also rotate together therewith, in a clockwise direction. Switch lever 26 which has one end in contact with the cam periphery of switch cam 20 is rotated in accordance with the rotation of switch cam 20, in the counter-clockwise direction, against the biasing force of spring 25, and closes motor drive switch S2.

When motor drive switch S2 is closed, the output of OR gate OR2 will remain at a "High" level to maintain the energization of motor 2 so long as switch S2 remains closed, even if the shutter button should subsequently be released and switch S6 is opened to render the outputs of AND gates AN3 and AN4 at "Low" levels. As pin 39 carried by clutch gear 6 rotates with the rotation of clutch gear 6, switch lever 40, which is in contact with the pin 39 rotates in the counterclockwise direction, and opens position detector switch $S_1$ after the motor drive switch $S_2$ is closed. Also, mirror drive lever 24 one end of which is in contact with the periphery of mirror drive cam 22 is rotated in the clockwise direction by the rotation of mirror drive cam 22 against the biasing force of spring 23, thus operating the mirror drive mechanism (not shown) to retract the reflex mirror from the photographic light path. At the time when the mirror drive is completed, switch cam 20 is rotated approximately one quarter turn, and one end of switch lever 26 falls into depression 20b on switch cam 20 under the biasing force of spring 25 to open motor drive switch S2. The opening of switch S2 make the outputs of OR gate OR2 and AND gate AN6 "low" levels to block motor drive transistor Q11. At this time, the drop of the output level of AND circuit AN6 causes monostable multivibrator MM2 to output a "high" level signal for the period of time given by delay circuit D3. This "high" level signal output causes transistors Q5 and Q6 via to conduct OR gates OR3 and OR4 to short circuit motor 2 and stop it abruptly.

Although, shutter charge plate 21 also rotates in the same way as switch cam 20 and mirror drive cam 22, charge pin 34 carried by shutter charge plate 21 does not engage bent portion 35a of the charge lever during this motor rotation, as one end 28a of stopper lever 28 has not reached cam surface 21a of the projection of shutter charge plate 21 in the sense of relative movement therebetween, so that stopper lever 28 does not rotate. Also, clutch gear 6 stops at a position where it has rotated approximately one half rotation, at which position pin 39 does not engage switch lever 40, with position detector switch $S_1$ open. Accordingly, even if the shutter button is kept depressed to maintain release switch S6 closed, the output of AND gate AN3 is at a "low" level, and the motor 2 will not be energized.

Substantially simultaneously with the stopping of the motor 2, the first or preceeding curtain of the focal plane shutter will be caused to travel by an unillustrated shutter mechanism, commencing the exposure. After a predetermined period of time determined by an unillustrated shutter time control, the trailing curtain of the shutter is caused to travel, terminating the exposure. The completion of the travel of the trailing curtain is detected by exposure completion detector switch S7, whereupon a "high" level signal is output from monostable multivibrator MM1 for a predetermined period of time given by delay circuit D2. This output causes the outputs of OR gate OR2, AND gate AN6, and OR gate OR4 to go to "high" levels, making motor drive transistors Q5 and Q11 conductive, so that current is supplied to the motor 2 in the direction of the arrow E, causing the motor 2 to commence rotating in the counterclockwise direction. Clutch gear 6 begins to rotate from the aforementioned stop position, and in the same way as described above, the rotation thereof is transmitted to charge gear 19 via transmission clutch 6a and transmission gear 17. Switch lever 26 again rotates in the counterclockwise direction in accordance with the rotation of switch cam 20, and closes motor drive switch $S_2$ within a predetermined time given by delay circuit D2. In the same way as described above, the energization of motor 2 is maintained as long as this switch $S_2$ is closed.

Also, mirror drive lever 24 is conversely rotated in the counterclockwise direction in accordance with the rotation of the mirror drive cam 22, causing the mirror to be returned into the photographic light path by the mirror drive mechanism (not shown). When, in accordance with the rotation of shutter charge plate 21, one end 28a of stop lever 28 comes into contact with projecting cam surface 21a of shutter charge plate 21, stop lever 28 rotates in the clockwise direction against the biasing force of spring 27, and other end 28b is disengaged from depression 12a of the stop cam 12. In conjunction with this, advance completion detector switch S4 is opened by pin 28c on stop lever 28. At this time, clutch plate 10 is still stationary, and the stop cam 12 is also stationary. Around this time, charge pin 34 engages bent portion 35a of charge lever 35 due to the rotation of shutter charge plate 21, and charge lever 35 is drawn upward to the right against the biasing force of spring 36, causing the unillustrated shutter cocking mechanism to be operated. Thus the shutter cocking is commenced.

When clutch roller 9, which is pivoted on the other end of clutch lever 7, comes into engagement with projecting cam surface 10a of clutch plate 10 due to the rotation of the clutch gear 6, clutch plate 10 is pushed by this clutch roller 9 and begins to rotate in the clockwise direction. As stop cam 12 and stop lever 28 have, as mentioned above, already been disengaged from each other, clutch plate 10 rotates in the clockwise direction, causing the idler gear 14 to be rotated via transmission gear 13. As electromagnetic coil 53 of electromagnetic clutch 30 is not energized as mentioned above, electromagnetic clutch 30 couples sprocket 31 and sprocket shaft 29 via clutch plate 51. Accordingly, the rotation of idler gear 14 is transmitted to sprocket 31 via the sprocket gear 15, and film 33 is advanced a predetermined amount, that is to say, one frame, and wound up by spool 1. At the same time, the rotation of idle gear 14 is transmitted to spool 1 via spool gear 16 and friction spring 32. Spool gear 16 rotates a suitable amount to advance the film more than one frame. On the other hand, the amount of rotation required of the spool 1 progressively decreases in accordance with the continuing wind-up of the film 33 onto the spool 1, but the friction spring 32 compensates for any difference between the amounts of rotation of the spool 1 and the spool gear 16, to prevent excess tension being applied to film 33. When the advancing of one frame of film is completed, stopper cam 12 will have rotated precisely one rotation, and the rotational position of stop cam 12 will be that shown in FIG. 1. By this time, shutter charge plate 21 will have rotated a predetermined amount, and projecting cam surfaces 21a and 21b thereof have been disengaged from one end 28a of stop lever 28 with the other end 28b of stop lever 28 having been in contact with the cam surface of stop cam 12. Accordingly, the other end 28b of stop lever 28 will have been biased by spring 27 to fall into depression 12a on stop cam 12, and the advance completion detector switch S4 will be closed by the counterclockwise rotation of stop lever 28. With the above conditions, the engagement between stop cam 12 and stop lever 28 is renewed, and it becomes impossible for the transmission gear 13 to rotate in the clockwise direction, and the advancing of the film by sprocket 31 and spool 1 is completed.

At the same time, rotation of clutch plate 10 is rendered impossible, so that clutch roller 9 rides over the projecting cam portion of clutch plate 10 against the biasing force of the unillustrated spring of clutch lever 7. Also, the gate of AND gate AN1 is blocked by the closure of switch $S_4$, and the setting of flip-flop F1 is prohibited. Substantially simultaneously with the completion of the film advancing, cocking of the shutter by the engagement of charge pin 34 and bent portion 35a of charge lever 35 is also completed. When the shutter charging is completed, projection 35b of the charge lever 35 press the movable contactor arm of charge completion detector switch $S_3$, closing switch $S_3$. At the same time, the rotation of shutter charge plate 21 disengages charge pin 34 from bent portion 35a, and charge lever 35 is returned back to the left by the biasing force of spring 36. Thus, switch $S_3$ is closed only momentarily. Immediately thereafter, one end 26a of switch lever 26 falls into depression 20c on the switch cam 20, opening motor drive switch $S_2$, so that the motor 2 is once again brought quickly to a stop. The various relevant mechanisms may slightly overrun in the brief time until motor 2 come to stop fully. In this state, pin 39 on the clutch gear 6 is at the illustrated position, with position detector switch $S_1$ closed. Also, the other mechanisms, too, have returned to the state shown in FIG. 1. Thus the foregoing operations may be repeated, by depressing the shutter button again.

Next, explanation will be made with regard to the situation when the exposure of the last frame of film is completed. At the last frame of film, exposure is effected in the same manner as in the foregoing, by depressing the shutter release button, and motor 2 is then driven upon detection of the completion of the shutter back curtain travel. In the same way as in the foregoing, when one end 28a of stop lever 28 engages projecting cam surface 21a of shutter charge plate 21 due to the rotation of the shutter charge plate, stop lever 28 is rotated in the clockwise direction against the biasing force of spring 27. This causes disengagement of the stopper lever 28 from stop cam 12, and the advance completion detector switch $S_4$ is opened by pin 28c. Next, the rotation of clutch gear 6 causes clutch roller 9 to push projecting cam surface 10a of clutch plate 10, and clutch plate 10 begins to rotate. Thus the film advancing is commenced via the transmission gear 13 and the idler gear 14. However, when it becomes impossible for any more film to be supplied from the film cartridge (not shown) towards spool 1 during the advancing of the film, the rotation of sprocket 31 and spool 1 is forcibly stopped. Consequently clutch plate 10 becomes unable to rotate, so that the load increases and clutch roller 9 rides over the projecting cam portion of clutch plate 10 against the biasing force of the unillustrated spring acting on clutch lever 7, in a manner similar to that above described. On the other hand, as the drive operation of the shutter drive section B from the motor 2 is unrelated to the aforementioned film drive section C, the shutter cocking operation continues normally. When the shutter charging operation is completed, the charge completion detector switch $S_3$ is momentarily closed, after which one end 26a of switch lever 26 falls into the depression 20c on the switch cam 20, whereby motor drive switch $S_2$ is opened and the motor 2 is brought to a rapid halt, as described above. At this time, the shutter charge plate 21 returns to the illustrated initial state, while stopper cam 12 has not rotated to the position where it is capable of engaging the other end 28b of the stop lever 28, the other end 28b of stop lever 28 contacts the cam surface of stop cam 12, and advance completion detector switch $S_4$ remains opened by pin 28c.

At a point of time at which a predetermined period of time given by the delay circuit D1, from the closure of charge completion detection switch $S_3$, has passed, advance completion detector switch $S_4$ is opened, so that the output of AND gate AN1 goes to a "high" level, and flip-flop F1 is set. Accordingly the Q output of flip-flop F1 goes to a "high" level, the gate AN4 is blocked, and subsequent motor drive by the closure of release switch $S_6$ is prohibited. Subsequently, after the lapse of a predetermined period of time given by the delay circuit D4, that is to say after the motor 2 stops, flip-flop F2 is set, and its Q output goes to a "high" level. Thus current is passed to electromagnetic coil 53 of electromagnetic clutch via the transistor Q1, attracting clutch plate 51 provided integrally with the sprocket shaft 29, against the biasing force of spring 52, whereby clutch plate 51 and the friction ring 50 are friction coupled. That is to say, the coupling of sprocket shaft 29 and sprocket 31 is released, and the coupling is switched to couple the sprocket shaft 29 with rewind gear 43. At the same time, motor drive transistors Q6 and Q10 become conductive, and motor is fed with current in the direction of the arrow F which is reverse to that mentioned earlier, and motor 2 begins to rotate in the clockwise direction. The reversing of the motor 2 causes charge gear 6 to rotate in the counterclockwise direction, and in consequence the clutch lever 7 and the clutch roller 9 also rotate in the counterclockwise direction. However, at this time, cut-out portion 6b of transmission clutch 6a for the transmission to the shutter drive section B, and the cut-out portion of transmission gear 17 simply mutually slide over their sawtooth-shaped inclined surfaces against the biasing force of an unillustrated spring, so that the rotation of clutch gear 6 is not transmitted to shutter drive section B. On the other hand, clutch roller 9 pushes projecting cam surface 10b of clutch plate 10 on the side opposite to the aforementioned cam surface 10a, thus rotating clutch plate 10 in the counterclockwise direction. Thus via transmission gear 13 and idler gear 14, sprocket gear 15 and spool gear 16 are rotated in the counterclockwise direction. At this time, sprocket 31 has its friction coupling with sprocket shaft 29 broken by electromagnetic clutch 30, and is allowed to rotate freely. As sprocket shaft 29 is friction coupled to rewind gear 43 by electromagnetic clutch 30, the rotation of sprocket shaft 29 is transmitted to rewind fork 47 via rewind pulley 44, belt 45 and rewind pulley 46. Spool 1 is in the condition capable of rotating at a higher speed than the rewind speed of rewind fork 47 to be mentioned later, via spool gear 16 and friction ring 32, whereby any load on film 33 is prevented. Rewind fork 47 rotates in the counterclockwise direction to rewind film 33 into the film cartridge.

When the film rewinding nears completion, the leading end of film 33 moves to the film cartridge side of the position of pin 49 (i.e. to the left in the drawing), absence of the film is detected by pin 49, and film presence detector switch $S_5$ is opened. Clutch gear 6 continues to rotate and pin 39 carried by clutch 6 pushes switch lever 40 to close position detector switch S₁, whereupon the output of AND gate AN2 becomes a "high" level, and flip-flop F1 and F2 are reset via OR gate OR1. Resetting of flip-flop F2 blocks motor drive transistor Q10 and transistor Q1 is also blocked to stop the power supply to electromagnetic clutch 30. At the same time, the drop in the Q output signal of flip-flop F2 causes a "high" level pulse to be output from monostable multivibrator MM2 via OR gate OR5, whereby motor drive transistors Q5 and Q6 are rendered conductive, short-circuiting the two terminals of motor 2 and causing motor 2 to stop abruptly. In this state, the position of pin 39 and the positional relationship between clutch roller 9 and clutch plate 10, as shown, restore nearly to their initial states, and stop cam 12 and stop lever 28 are at the positions where they are engageable each other. When these positional relationships do not restore completely to the initial states, the next film advancing might not attain the predetermined quantity, but the subsequent operation of the camera is to make a non-exposure film winding following a film loading, causing no problem.

As stated hereinabove, by providing film drive section C and shutter drive section B respectively with switch S₄ for detecting the completion of one-frame film advancing, and switch S₃ for detecting the completion of shutter charging, it is possible to simply detect the inability to advance the film after the last frame of film has been exposed. As the detection means for detecting the state of the motor drive mechanism at the time of the completion of shutter charging, switch S₃ may be replaced by a switch such as, for example, switch S1 that detects via the switch lever 40 the rotational position of clutch pin 39 carried by clutch gear 6, and which rotates precisely twice for one exposure. In this case, switch S1 need not be closed simultaneously with the closure of switch S₃, but may be closed after the closure of switch S₃.

Having described our invention as related to the embodiment shown in the accompanying drawing, it is our intention that the invention be not limited by any of the details of description, unless otherwise specified, but rather be construed broadly within its spirit and scope as set out in the accompanying claims.

What we claim is:

1. A camera, in which a film is transported by the drive force of a motor and which includes a shutter, comprising:
a motor;
a film drive mechanism for winding-up the film;
a shutter drive mechanism for cocking the shutter;
a transmitting mechanism including a first and second transmitting means for transmitting the drive force of said motor separately to said film drive mechanism and said shutter drive mechanism, said film drive and shutter drive mechanisms being arranged to complete their operations almost simultaneously when the film is wound up normally;
a first detecting means for detecting the operation of the film drive mechanism and generating a first detecting signal when the film wind-up is completed;
a second detecting means associated with the mechanism between the motor and the shutter drive mechanism, for generating a second detecting signal when shutter cocking is completed; and
a discriminating means for generating a third detecting signal when the second detecting signal is generated before the generation of the first detecting signal.

2. A camera according to claim 1 wherein said first detecting means includes a first switch for generating said first detecting signal upon closure thereof, said first switch being arranged to be opened in response to the commencement of the wind-up of the film and closed in response to the completion of the film wind-up, and said second detecting means includes a second switch for generating a closure signal upon closure thereof, said switch being arranged to be closed meomentarily in response to the completion of the shutter cocking, and a delay circuit responsive to said second switch closure signal and generating said second detecting a signal after a lapse of a predetermined delay time from the generation of said closure signal such that said second detecting signal is generated after the generation of said first detecing signal in the case of normal film wind-up operation.

3. A camera according to claim 2 further comprising a power supply circuit and said discriminating means includes and AND gate fed with said first detecting signal and said second detecting signal via said delay circuit, said AND gate generating a "high" level output signal when said first and second detecting signals are fed simultaneously thereto; a power on reset circuit for generating a "high" level pulse signal in response to the actuation of said power supply circuit; and a flip-flop which is fed with the output of said AND gate and the putput of said power on reset circuit respectively at the set terminal and reset terminal thereof, said flip-flop generating said third detecting signal of a "high" level by the setting thereof in response to the "high" level signal of said AND gate.

4. A camera according to claim 3 further comprising a preparation mechanism movable prior to the exposure operation of the camera for preparing the camera for the exposure operation, said shutter drive mechanism includes a preparation drive mechanism for driving said prepartion mechanism by the drive force of said motor, and said discriminating means includes a third switch for generating a release signal of a "high" level in response to a shutter release operation, an inverter for inverting the level of said third detecting signal output from said flip-flop and generating the inverted signal and a second AND gate responsive to said release signal and said inverted signal to generate an output to energize said motor in response to said release signal and generates an output to stop said motor in response to said inverted signal.

5. A camera according to claim 1 wherein said film drive mechanism includes a film wind-up mechanism having a sprocket for advancing the film, a first gear means for operationally connecting said first transmitting means and said sprocket, a spool for winding-up the film therearound, a spring friction-coupled to the spook, and a second gear means for operationally connecting said first transmitting means and said spring, the gear ratio of said first and second gear means being such that the rate of the film wind-up by said first gear means is slower than that by said second gear means.

6. A camera according to claim 1 further comprising a first clutch for coupling said motor with said first transmitting means to enable the transmission of the drive force of said motor to said first transmitting means when the load of film wind-up in said film wind-up mechanism is lower than a predetermined value, said first clutch disabling said transmission when said load exceeds said value; and a second clutch for coupling said motor with said second transmitting means for the transmission of the drive force of said motor to said second transmitting means during the period of shutter cocking operation.

7. A camera according to claim 1 further comprising a motor drive circuit for driving said motor, and wherein said motor drive circuit includes a first switch for momentarily generating an initiation signal to commence the motor driving, a second switch arranged to be closed by a cam member provided in said shutter drive mechanism at the beginning of the operation of said shutter drive mechanism caused by said motor driving, said second switch remaining closed to continue to generate a maintaining signal for maintaining the motor driving, an OR gate which is fed with said initiation signal and said maintaining signal, and a circuit means for driving said motor in response to the output of said OR gate.

8. A camera according to claim 7 wherein said second switch is arranged to be opened upon completion of a shutter cocking, and said motor drive circuit further includes a pulse generating circuit for generating a pulse signal in response to the opening of said second switch and means for short-circuiting both end terminals of said motor in response to the pulse signal, the duration of the pulse signal being determined to be more than the period required to stop said motor.

9. A camera according to claim 1 wherein said film drive mechanism includes a film wind-up mechanism for winding-up the film, a film rewind mechanism for rewinding the film, a selective tramsmission means for selectively transmitting the drive force of said motor transmitted through said first transmitting means to said film wind-up mechanism and said film rewind mechanism, and a selection means for selecting the transmission of said selective transmission means in accordance with said third detecting signal.

10. A camera according to claim 9 wherein said selective transmission means includes a clutch selectively connectable with said film wind-up mechanism and said film rewind mechanism, and said selection means includes a spring for connecting said clutch member to said film wind-up mechanism by urging the former to the latter, and an electromagnetic means responsive to said third detecting signal for connecting said clutch member with said film rewind mechanism against the force of said spring.

11. A camera according to claim 9 wherein said motor is a reversible motor and rotatable in opposite directions for the winding-up and rewinding of said film, and said camera further includes means for reversing the rotational direction of said motor in response to said third detecting signal.

12. A camera according to claim 9 wherein said first detecting means includes a first switch for generating said first detecting signal upon closure thereof, said first switch being arranged to be opened in response to the commencement of the wind-up of the film and is closed in response to the completion of the wind-up of the film, and said second detecting means includes a second switch for generating a closure signal upon closure thereof, said second switch being arranged to be closed momentarily in response to the completion of the shutter cocking, and a delay circuit responsive to said second switch closure signal and generating said second detecting signal after a lapse of a predetermined delay time from the generation of said closure signal such that said second detecting signal is generated after the generation of said first detecting signal in the case of normal film wind-up operation 13. A camera according to claim 12 wherein said camera includes a power supply circuit, said discriminating means includes an AND gate fed with said first detecting signal and said second detecting signal via said delay circuit, said AND gate generating a "high" level output signal when said first and second detecting signals are fed simultaneously thereto, a power on reset circuit for generating a "high" level pulse signal in response to the actuation of said powr supply circuit; and a flip-flop fed with the output of said AND gate and the output of said power on reset circuit, respectively, at the set terminal and reset terminal thereof, said flip-flop generating said third detecting signal of a "high" level by the setting thereof in response to the "high" level signal of said AND gate.

14. A camera according to claim 13 wherein said film drive mechanism includes a sprocket for advancing the film and said film rewind mechanism includes a third switch closed in response to the presence of the film and is opened in response to the absence of the film, said third switch being provided in the vicinity of the sprocket, said transmitting mechanism includes a fourth switch for detecting an initial position of said transmitting mechanism from which the latter commences its operation, and said discriminating means includes a film wind-up completion detecting circuit having an output terminal connected to the reset terminal of said flip-flop and which generates an output signal of a "high" level when said third switch detects the absence of the film and at the same time said fourth switch detects the initial position of said transmitting mechanism.

* * * * *